United States Patent [19]

Sasaki et al.

[11] Patent Number: 4,663,251

[45] Date of Patent: May 5, 1987

[54] ZINC-BROMINE BATTERY

[75] Inventors: Torahiko Sasaki; Kyoichi Tange, both of Susono; Masahiro Okawa; Yoshihiro Suzuki, both of Okasaki, all of Japan

[73] Assignee: Toyota Jidosha Kabushiki Kaisha, Aichi, Japan

[21] Appl. No.: 813,952

[22] Filed: Dec. 27, 1985

[30] Foreign Application Priority Data

Dec. 27, 1984 [JP] Japan ................... 59-278635

[51] Int. Cl.$^4$ ................ H01M 10/36; H01M 8/08
[52] U.S. Cl. ........................... 429/29; 429/70; 429/105
[58] Field of Search ............ 427/70, 15, 105, 101, 427/29

[56] References Cited

U.S. PATENT DOCUMENTS 4,105,829  8/1978  Venero ..................... 429/70
4,614,693  9/1986  Hashimoto et al. ........... 429/105

Primary Examiner—Donald L. Walton
Attorney, Agent, or Firm—Parkhurst & Oliff

[57] ABSTRACT

A zinc-bromine battery is disclosed which includes anode and cathode reaction tanks separated from each other by a separator membrane for preventing self-discharge, and an electrolyte storage tank storing an electrolyte with a bromine complexing agent added thereto. Catholytes and anolytes are circulated between the cathode reaction tank and the anode reaction tank, respectively, and the electrolyte storage tank. The bromine produced in the catholyte is complexed by a complexing agent and is stored. A first connection pipe and a second connection pipe are provided for the purpose of forcibly mixing part of the anolyte and catholyte with each other therethrough. The first connection pipe receives part of the catholyte which has flowed from the cathode reaction tank to the catholyte storage tank from a position which is remote from an inlet for the catholyte, and supplies it to the anolyte storage tank. The second connection pipe, on the other hand, supplies part of the anolyte to the catholyte.

11 Claims, 5 Drawing Figures

ZINC-BROMINE BATTERY

BACKGROUND OF THE INVENTION

1. Field of the Invention

This invention relates to a zinc-bromine battery, and more particularly, to improvements of an electrolyte circulation type zinc-bromine battery having electrolyte storage tanks.

2. Description of the Prior Art

A zinc-bromine battery is known as a new type of battery. The following fundamental electrochemical reactions take place in a reaction tank provided with an anode and a cathode of a zinc-bromine battery.

The reaction at the cathode is:

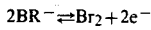

$$2BR^- \rightleftharpoons Br_2 + 2e^-$$

The reaction at the anode is:

$$Zn^{2+} + 2e^- \rightleftharpoons Zn \quad (1)$$

The cell reaction is:

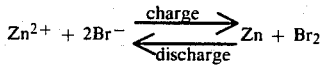

$$Zn^{2+} + 2Br^- \underset{\text{discharge}}{\overset{\text{charge}}{\rightleftharpoons}} Zn + Br_2$$

As is clear from the reaction formulae, zinc Zn is deposited during charge and bromine $Br_2$ which dissolves into the electrolyte is produced at the cathode. On the other hand, during discharge the zinc Zn deposited onto the anode is oxidized to $Zn^{2+}$ and dissolves into the electrolyte, while the bromine $Br_2$ in the electrolyte is reduced to bromine ion $2Br^-$ and dissolves into the electrolyte.

In such a zinc-bromine battery, the concentration of the bromine $Br_2$ in the electrolyte which is produced during charge increases as the charging time passes, and the bromine $Br_2$ gradually diffuses toward the anode. The bromine $Br_2$ reacts with the zinc Zn at the anode and becomes zinc ion $Zn^{2+}$ and bromine ion $Br^-$, thereby causing self-discharge. The zinc-bromine battery is therefore provided with a separator membrane which allows zinc ion $Zn^{2+}$ and bromine ion $Br^-$ to permeate therethrough but which impedes the permeation of bromine $Br_2$ in order to separate the reaction tank into anode and cathode reaction tanks, thereby preventing bromine $Br_2$ from diffusing from the cathode side to the anode side.

Furthermore, in order to prevent diffusion of the bromine $Br_2$, a complexing agent is added to the electrolyte of the zinc-bromine battery, so that the bromine $Br_2$ dissolved into the electrolyte on the cathode side is converted into a complex compound which is insoluble in the electrolyte, and is deposited and precipitated in the form of oil in the electrolyte.

FIG. 3 shows a conventional zinc-bromine battery produced on the basis of the above-described principle. In this battery, a cathode 12 and an anode 14 are provided within a reaction tank 10, one on each side thereof, whereby the electrochemical reaction indicated by the formulae (1) takes place between the cathode 12 and anode 14 through electrolytes 16.

In such a zinc-bromine battery, zinc-bromine ($ZnBr_2$) aqueous solution is used as the electrolyte 16, and an electric conductance improver, a bromine complexing agent, a dendrite inhibiter and the like are added thereto as occasion demands.

During charge, the charging reaction shown in the formulae (1) takes place in the reaction tank 10, and bromine $Br_2$ is generated on the cathode side 12 and dissolves into the electrolyte 16, while on the anode side 14 zinc Zn is deposited and a precipitation layer 18 is formed on the anode 14.

On the other hand, the reaction which is reverse to the charging reaction takes place during discharge. Bromine $Br_2$ is reduced to bromine ion $2Br^-$ on the cathode side 12 and dissolves into the electrolyte 16, while on the anode side 14 the zinc precipitation chamber 18 is oxidized to zinc ion $Zn^{2+}$, and dissolves into the electrolyte 16.

The reaction tank 10 in which these electrochemical reactions take place is provided with a separator membrane 20 which divides the interior of the tank into a cathode reaction tank 10a and an anode reaction tank 10b so as to prevent any occurrence of self-discharge caused by the bromine $Br_2$ which is produced during charge.

The separator membrane allows the electrolyte 16 to permeate therethrough but impedes the permeation of the bromine $Br_2$ which is in solution in the electrolyte 16, so as to prevent any occurrence of self-discharge. An ion-exchange membrane or a micro-porous membrane is generally used as the separator membrane 20, but a micro-porous membrane is more preferable from the viewpoint of reducing the inner resistance of the battery.

In an electrolyte circulation type battery, a catholyte storage tank 22 and an anolyte storage tank 24 are provided in order to store the electrolyte.

Pipes 26 and 28 provided between the catholyte storage tank 22 and the cathode reaction tank 10a constitute an electrolyte circulation passage, and a pump 30 provided in the circulation passage delivers the catholyte 16a which has reacted in the cathode reaction tank 10a to the storage tank 22, and supplies new electrolyte 16a from the storage tank 22 to the reaction tank 10a.

In the case wherein a bromine complexing agent is added to the electrolyte 16a, the bromine $Br_2$ generated during the charge is complexed, and is deposited as a complex compound which is insoluble in the electrolyte 16. This complex compound is subsequently precipitated and stored at the bottom of the storage tank 22 as a complex compound storing chamber 32, as is shown in the battery of FIG. 3.

The complex compound storing chamber 32 is connected to the pipe 28 by a complex compound supply pipe 36 having a valve 34. This valve 34 delivers the complex compound which has precipitated in the complex compound storing chamber 32 to the reaction tank 10a through the pipe 28 for the purpose of discharge.

Similarly, pipes 38 and 40 provided between the anolytic storage tank 24 and the anode reaction tank 10b constitute an electrolyte circulation passage, and a pump 42 provided in the circulation passage delivers the anolyte 16b which has reacted in the anode reaction tank 10b to the storage tank 24, and supplies new electrolyte 16b from the storage tank 24 to the reaction tank 10b.

In this way, this zinc-bromine battery can adequately store the electrolyte 16 in the storage tanks 22 and 24, cause the charging reaction shown in the formulae (1) in the stored electrolyte 16 during charge, store the bromine complex compound in the complex compound storing chamber 32, and form the zinc precipitation layer 18 on the anode 14, thereby storing electric power. During discharge, on the other hand, the zinc-bromine battery can deliver the bromine complex compound stored in the complex compound storing chamber 32 to the cathode reaction tank 10a, and cause the discharge reaction shown in the formulae (1) between the complex compound and the zinc precipitation layer 18 formed on the anode 14, thereby emitting the charged electric power.

Although a conventional zinc-bromine battery is capable of efficient charging and discharging in this way, it has the following problems which remain unsolved.

This kind of conventional zinc-bromine battery is completely divided into the cathode side and the anode side, and the catholyte 16a and the anolyte 16b are mixed with each other solely by permeation through the separator membrane 20. Since the separator membrane 20 has a predetermined resistance when the electrolyte 16 permeates it, it is impossible to store electric power by efficiently utilizing the zinc ions $Zn^{2+}$ which are contained in the catholyte 16a during charge. It is also impossible to effectively utilize the complexing agent contained in the anolyte when a bromine complexing agent is contained in the electrolyte 16.

FIG. 4 shows the change in zinc ion concentration of the catholyte 16a and the anolyte 16b during charge.

As is obvious from the above-described reaction formulae, during charge the zinc ions $Zn^{2+}$ are attracted to the anode 14 and zinc Zn is deposited.

At this time, since the cathode side is separated from the anode side by the separator membrane 20, it is much more difficult for the zinc ions $Zn^{2+}$ in the catholyte 16a to move toward the anode 14 than the zinc ions in the anolyte 16b. Therefore, since the zinc ions in the anolyte 16b are consumed sooner than the zinc ions $Zn^{2+}$ in the catholytic 16a and charging is completed at that point, it is impossible to perform charging by adequately utilizing the zinc ions contained in the catholyte 16a.

In particular, when a salt halogenide such as KCl is added to the electrolyte 16 as a supported salt in order to improve the electric conductance of the electrolyte 16, or when an electrolyte of high concentration (more than 3 Mol/L $ZnBr_2$) is used the difference in concentration of the electrolytes 16a and 16b becomes greater. Consequently, at the last stage of charge, the zinc ions contained in the anolyte 16b are reduced to an extreme extent in comparison with those of the catholyte 16a, and the utilizing ratio of the zinc ions contained in the electrolyte 16 is further lowered.

FIG. 5 shows the zinc ion concentration when KCl is added to the electrolyte 16. As is clear from the graph, the difference in concentration of the zinc ions contained in the electrolytes 16a and 16b is greater in this case than the difference shown in FIG. 4, and it will be understood that the utilization ratio of the zinc ions is thereby further lowered.

This is because the KCl added to the electrolyte 16 in this way reacts with the zinc ion $Zn^{2+}$ and becomes $(ZnCl_4)^{2-}$, so tha some of the zinc ions which should intrinsically be plus becomes minus ions and are attracted toward the cathode side, thereby substantially lowering the concentration of the zinc ions contained in the electrolyte 16b.

SUMMARY OF THE INVENTION

Accordingly, it is an object of the present invention to provide a zinc-bromine battery which is capable of reducing the difference in zinc ion concentration as between the catholyte and the anolyte, improving the utilization ratio of the zinc ions contained in the electrolyte, and increasing the charged electric energy.

To achieve this aim, a zinc-bromine battery according to the present invention includes a first connection pipe for receiving part of the catholyte which has flowed from a cathode reaction tank to an catholyte storage tank from a position which is remote from the inlet for the catholyte and supplying it to the anolyte storage tank where it is mixed with the anolyte, and a second connection pipe for supplying part of the anolyte to the catholyte in order to mix it with the anolyte so that the catholyte and the anolyte are forcibly mixed with each other through the first and second connection pipes.

The above-described structure of a zinc-bromine battery according to the present invention enables the catholyte which has a low bromine and bromine complex compound concentration to be supplied to the anode side through the first connection pipe, and the anolyte to be supplied to the cathode through the second connection pipe.

Accordingly, the zinc ions contained in the anolyte are supplied to the catholyte without increasing the concentration of bromine and its complex compound. As a result, it is possible to enhance the charging capacity by efficiently utilizing the zinc ions contained in the electrolytes, thereby improving the charging efficiency.

The above and other ojects, features and advantages of the present invention will become clear from the following description of the preferred embodiments thereof, taken in conjunction with the accompanying drawings.

DESCRIPTION OF THE PREFERRED EMBODIMENTS

Figure 3:
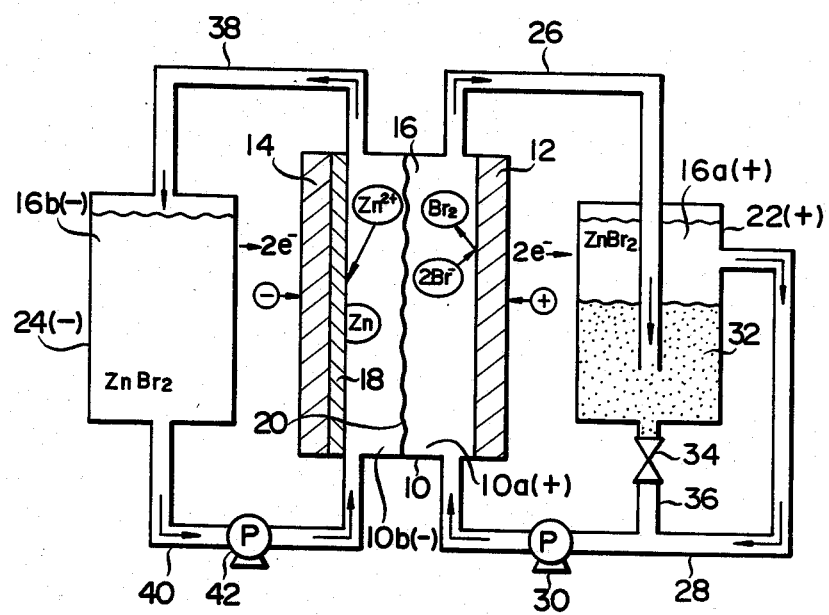
FIG. 3 is an explanatory view of a conventional zinc-bromine battery according to the present invention.
Figure 4:
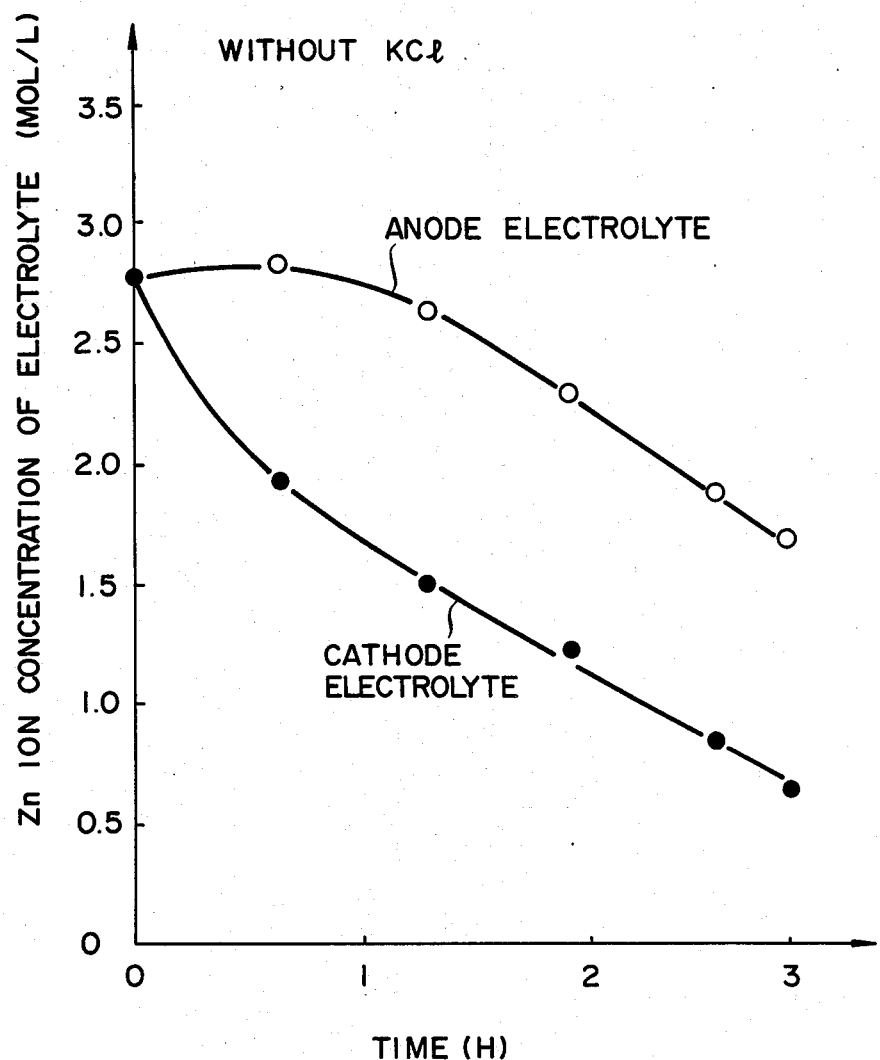
FIGS. 4 and 5 are characteristic curves of the conventional battery shown in FIG. 3.
Figure 5:
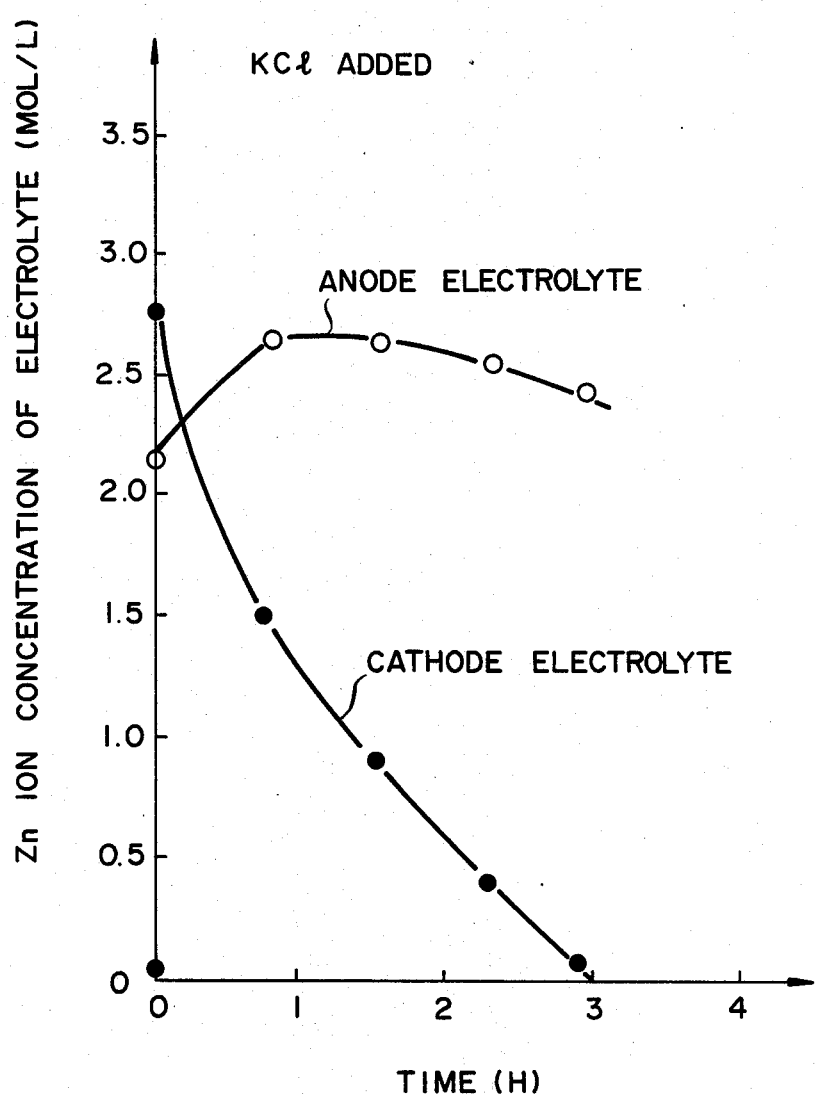

Preferred embodiments of the present invention will be described with reference to the accompanying drawings. The same numerals are provided for those elements which are the same as those in the conventional device shown in FIG. 3, and explanation thereof will be omitted.

First Embodiment

Figure 1:
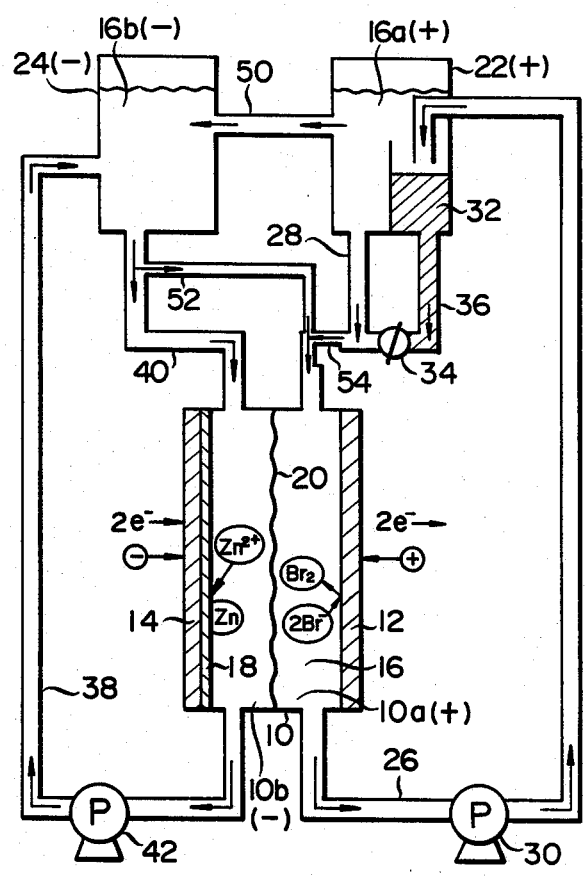
FIG. 1 is an explanatory view of a first embodiment of a zinc-bromine battery according to the present invention.

Referring first to FIG. 1, a first embodiment of a zinc-bromine battery according to the present invention is shown.

A transfer pipe is used, in this embodiment, as a first connection pipe 50 which connects the catholyte storage tank 22 to the anolyte storage tank 24 and adjusts the level of the liquid surfaces in the storage tanks 22 and 24.

A second connection pipe 52 is provided between the pipe 40 on the anode side and the pipe 28 on the cathode side.

A narrow portion 54 is formed in the pipe 28 by reducing its diameter at the relevant portion, and the second pipe is connected to the pipe 28 at this narrow portion 54. As a result, a difference in pressure is produced between both ends of the second connection pipe 52, namely between the pipe 40 and the narrow portion 54, and the anolyte 16b is automatically supplied to the cathode side through the second connection pipe 52, thereby being mixed with the catholyte 16a.

When the anolyte 16b is supplied to the cathode side in this way, the liquid surface of the anolyte storage tank 22 becomes lower than that of the catholyte storage tank 24, and the catholyte 16a is supplied to the anode side in correspondence with this lowering in level through the first connection pipe 50 which serves as a transfer pipe.

Consequently, the catholytes and anolytes 16a and 16b are forcibly mixed in the battery according to the invention.

In this embodiment, particular attention was paid to the fact that the concentration of bromine $Br_2$ and its complex compound in the catholyte 16a is low in the upper portion of the complex compound storing chamber 32, and the electrolyte 16a in this portion is supplied to the anode.

Second Embodiment

Figure 2:
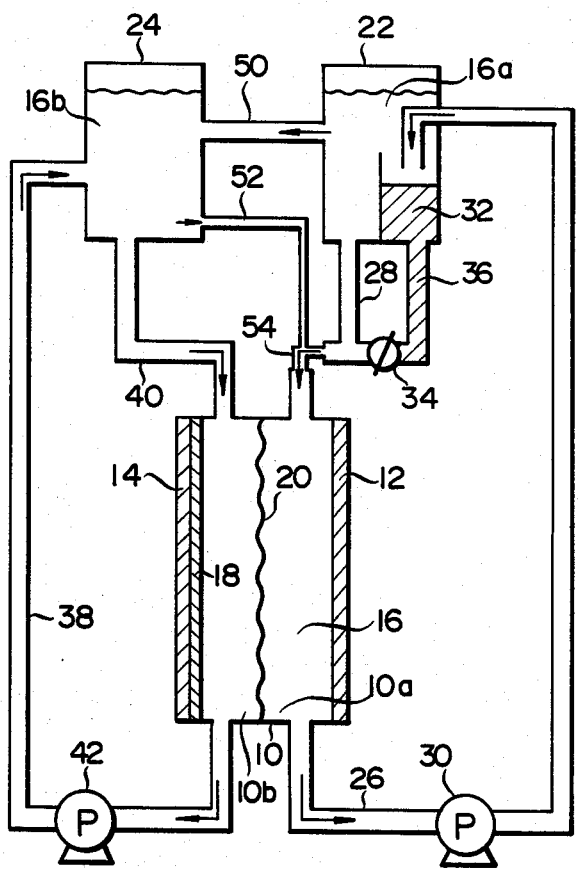
FIG. 2 is an explanatory view of a second embodiment of a zinc-bromine battery according to the present invention.

Referring next to FIG. 2, which shows a second embodiment of a zinc-bromine battery according to the present invention, the second connection pipe 52 is provided between the lower portion of the anolyte storage tank 24 and the narrow portion 54 of the pipe 28 on the cathode side.

Third Embodiment

This embodiment is not provided with the narrow portion 54 which is formed in the first and second embodiments. In order to produce a difference in pressure between both ends of the second transfer pipe 52 so as to automatically supply the anolyte 16b to the cathode side, the delivery pressure of the pump 30 on the cathode side is set to be higher than that of the pump 42 on the anode side.

This embodiment is so designed that the diameters of the first and second connection pipes take appropriate values which are smaller than those of the pipes 26, 28, 38 and 40 and that the electrolytes 16a and 16b can be appropriately mixed with each other.

Fourth Embodiment

Both means employed in the above-described embodiments are adopted in this embodiment. The narrow portion 54 is formed in the pipe 28 so as to produce a difference in pressure between both ends of the second connection pipe 52, and the delivery pressure of the pump 30 on the cathode side is set to be higher than that of the pump 42 on the anode side.

Although the first connection pipe 50 connects the storage tank 22 to the storage tank 24 in the first and the second embodiments, the invention is not limited to this construction, and it is possible to provide the first connection pipe 50 at any given position so long as it supplies the catholyte 16a which contains no complex compound from the complex compound storage chamber 32. It is also possible to provide the second connection pipe 52 at any other desired position as well as the position described in the above-described embodiments.

Furthermore, in the fourth embodiment the narrow portion 54 is formed on a portion of the pipe 28 and further the delivery pressure of the pumps 30 and 42 are set at different values, so that a difference in pressure is produced between both ends of the connection pipe so as to forcibly supply the electrolyte from one electrode side to the other electrode side. This invention is not restricted to these means and it is possible to provide an electrolyte supply pump in the first or second connection pipe for the exclusive purpose of supplying the electrolyte from one electrode side to the other electrode side.

The above-described structure solves the technical problems of the present invention and achieves the aim thereof.

Furthermore, since part of the electrolyte is forcibly mixed in the anolyte storage tank, it is possible to minimize the liquid resistance of the electrolyte and maximize the voltage efficiency by adjusting the amount mixed.

It is also possible to improve a conventional battery simply by attaching the connection pipes thereto.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A zinc-bromine battery wherein catholyte and anolyte are respectively circulated between
   a cathode reaction tank and an anode reaction tank which are separated from each other by a separator membrane for preventing self-discharge, and
   a catholyte storage tank and an anolyte storage tank, and wherein
   the bromine generated in said catholyte is complexed by a complexing agent and stored, said battery comprising:
   a first connection pipe for receiving part of said catholyte which has flowed from said cathode reaction tank to said catholyte electrolyte storage tank from a position which is remote from an inlet for said catholyte and supplying said part of said catholyte to said anolyte storage tank; and
   a second connection pipe for supplying part of said anolyte to said catholyte for the purpose of mixing;
   wherein said catholyte and said anolyte are forcibly mixed with each other through said first and second connection pipes.

2. A zinc-bromine battery according to claim 1, wherein said first connection pipe is provided between said catholyte storage tank and said anolyte storage tank.

3. A zinc-bromine battery according to claim 2, wherein a transfer pipe which connects said catholyte storage tank to said anolyte storage tank and adjusts the level of a liquid within said storing tanks is used as said first connection pipe.

4. A zinc-bromine battery according to claim 1, wherein a narrow portion is formed at a predetermined position within a length of a pipe on the cathode side, and said second connection pipe is provided between the anode side and said narrow portion of said pipe on the cathode side, so that any difference in pressure between the inlet and the outlet of said second connection pipe is utilized for forcibly supplying said electrolyte from one electrode side to the other electrode side.

5. A zinc-bromine battery according to claim 1, wherein the delivery pressure of a catholyte circulating pump is set to be higher than that of a anolyte circulating pump, so that any difference in pressure between the inlet and the outlet of said second connection pipe is utilized for forcibly supplying said electrolyte from one electrode side to the other electrode side.

6. A zinc-bromine battery according to claim 4, wherein the delivery pressure of a catholyte circulating pump is set to be higher than that of an anolyte circulating pump, so that any difference in pressure between the inlet and the outlet of said second connection pipe is utilized for forcibly supplying said electrolyte from one electrode side to the other electrode side.

7. A zinc-bromine battery according to claim 1, wherein an electrolyte-exchange pump is provided in at least one of said first and second connection pipes.

8. A zinc-bromine battery according to claim 1, wherein the diameters of said first and second connection pipes are smaller than those of the pipes used for circulating said electrolyte.

9. A zinc-bromine battery according to claim 1, wherein said first connection pipe supplies said catholyte from the upper portion of said catholyte storage tank to the anode side.

10. A zinc-bromine battery according to claim 1, wherein said first connection pipe supplies said catholyte to the cathode side from a passage situated on said position of the catholyte storage tank and the pipe on the cathode side.

11. A zinc-bromine battery comprising:
   a cathode reaction tank and an anode reaction tank which are separated from each other by a separator membrane for preventing self-discharge;
   a catholyte storage tank and an anolyte storage tank;
   a first connection pipe provided between said catholyte storage tank and said anolyte storage tank;
   a complex compound storage chamber within the catholyte storage tank for receiving and storing a precipitable bromine complex
   a second connecting pipe provided below the catholyte storage tank and the anolyte storage tank for mixing anolyte and catholyte prior to their entry into the cathode reaction tank.

* * * * *